United States Patent Office 3,611,693
Patented Oct. 12, 1971

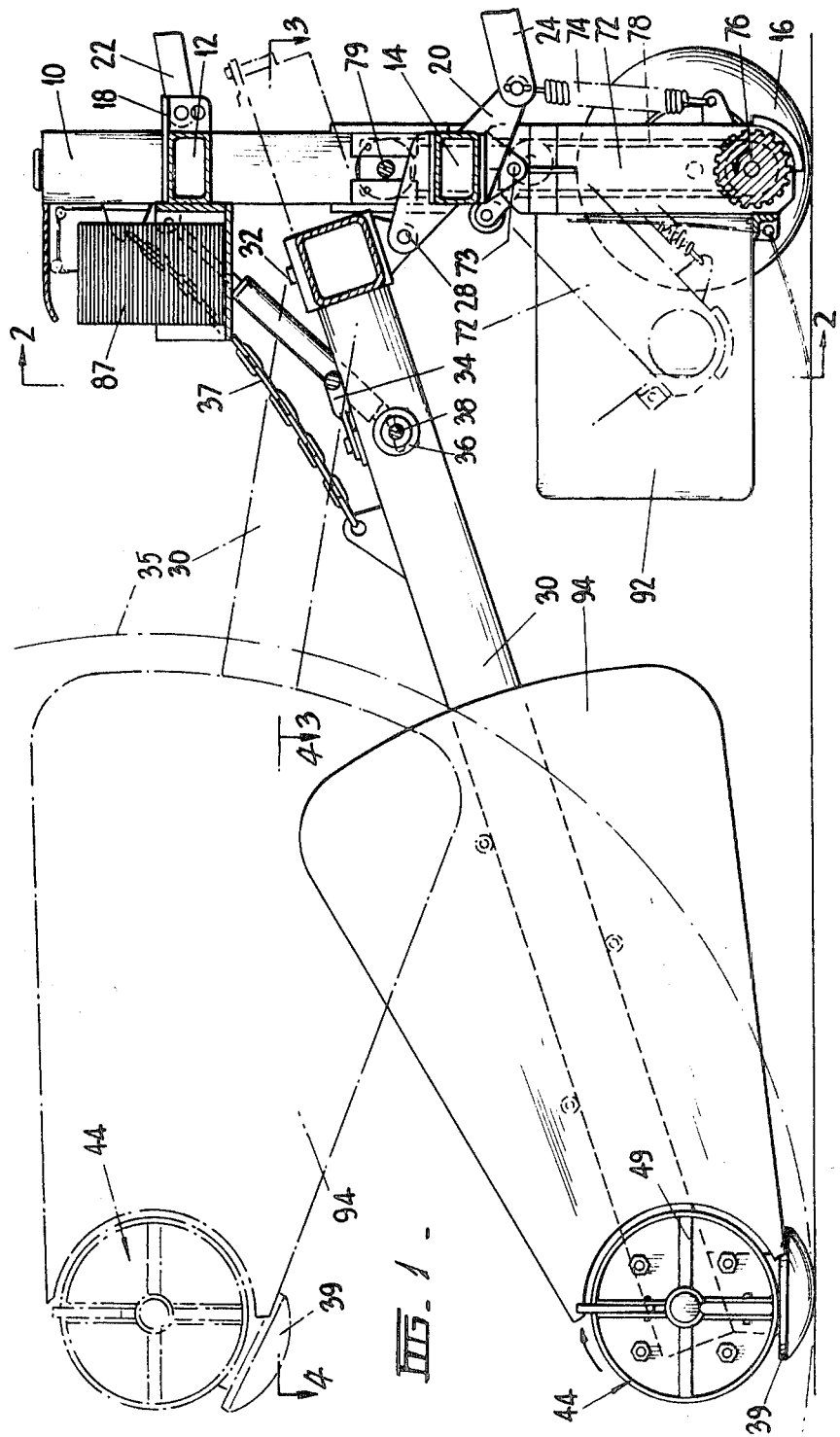

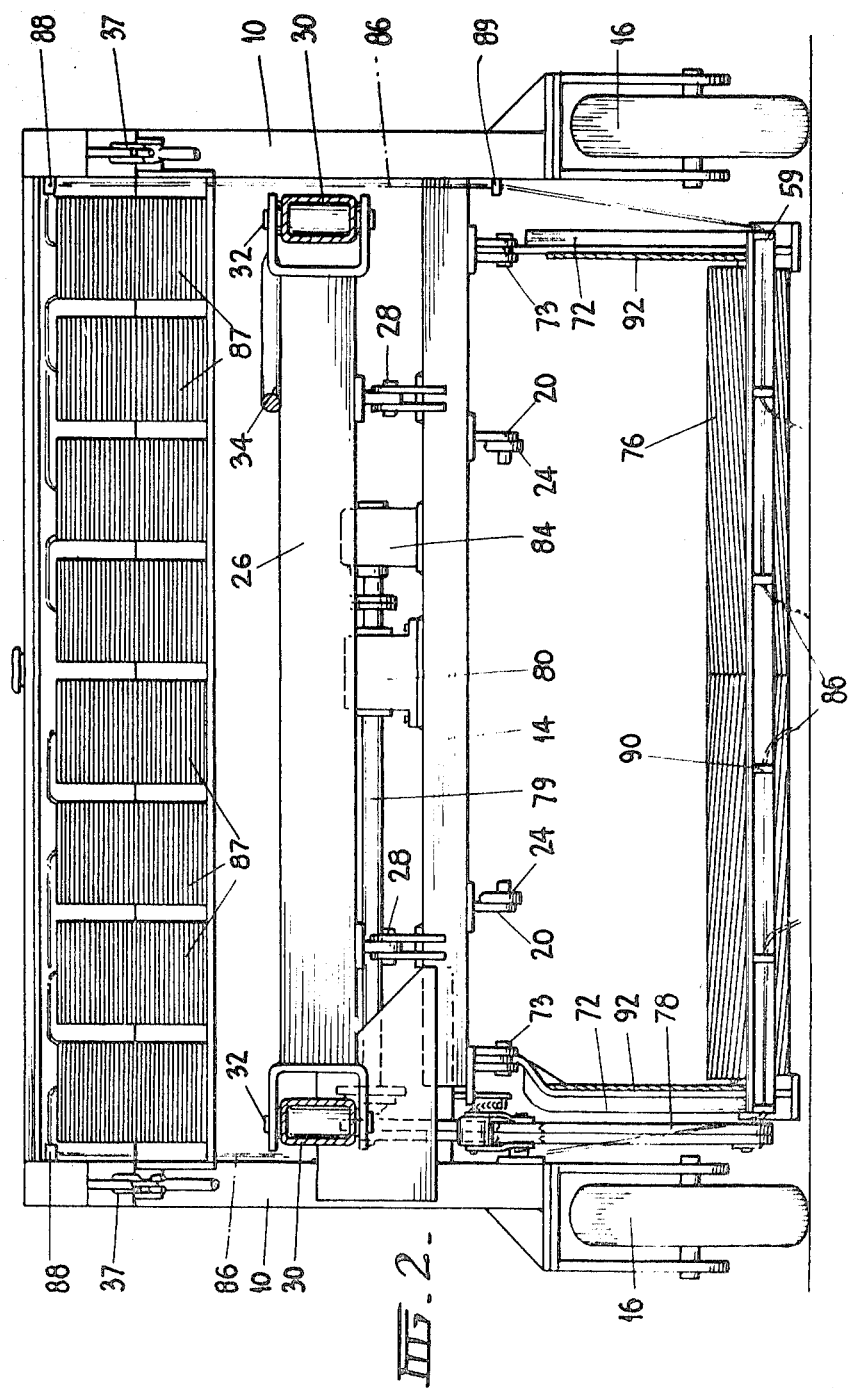

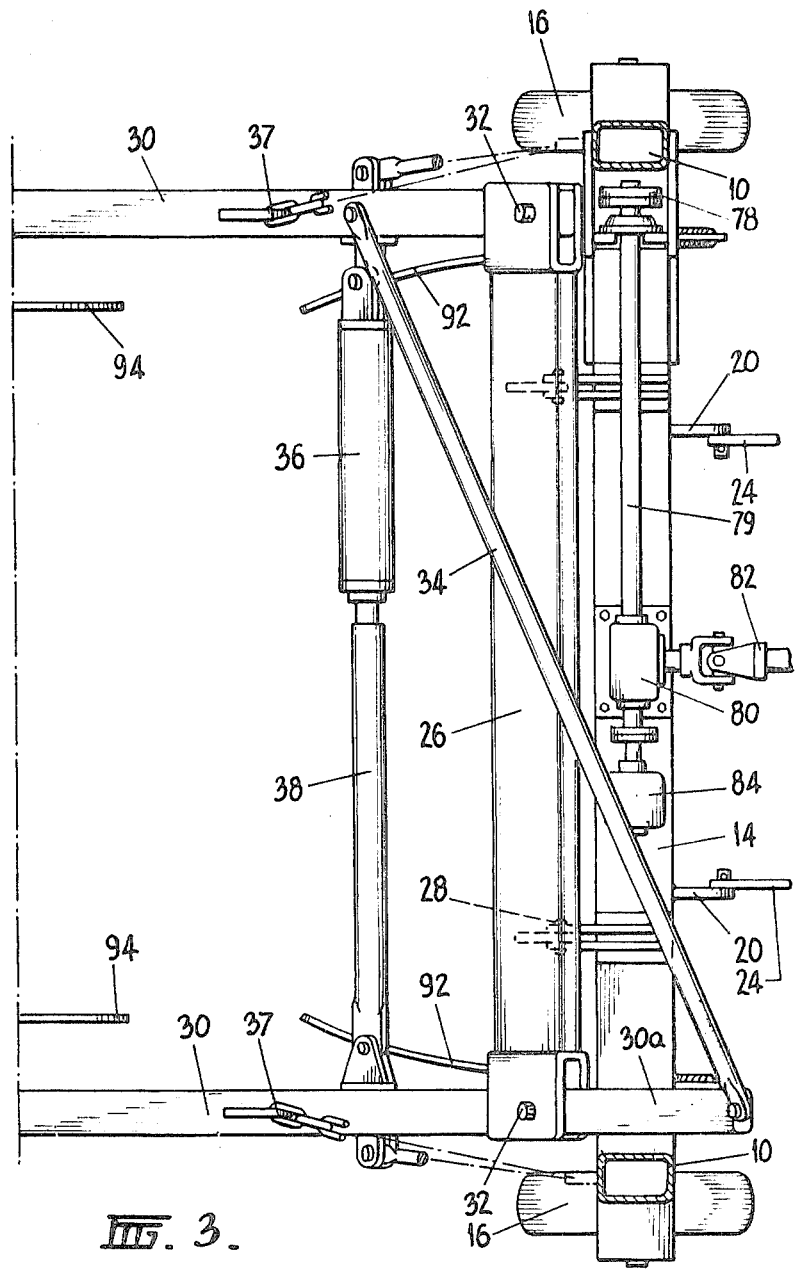

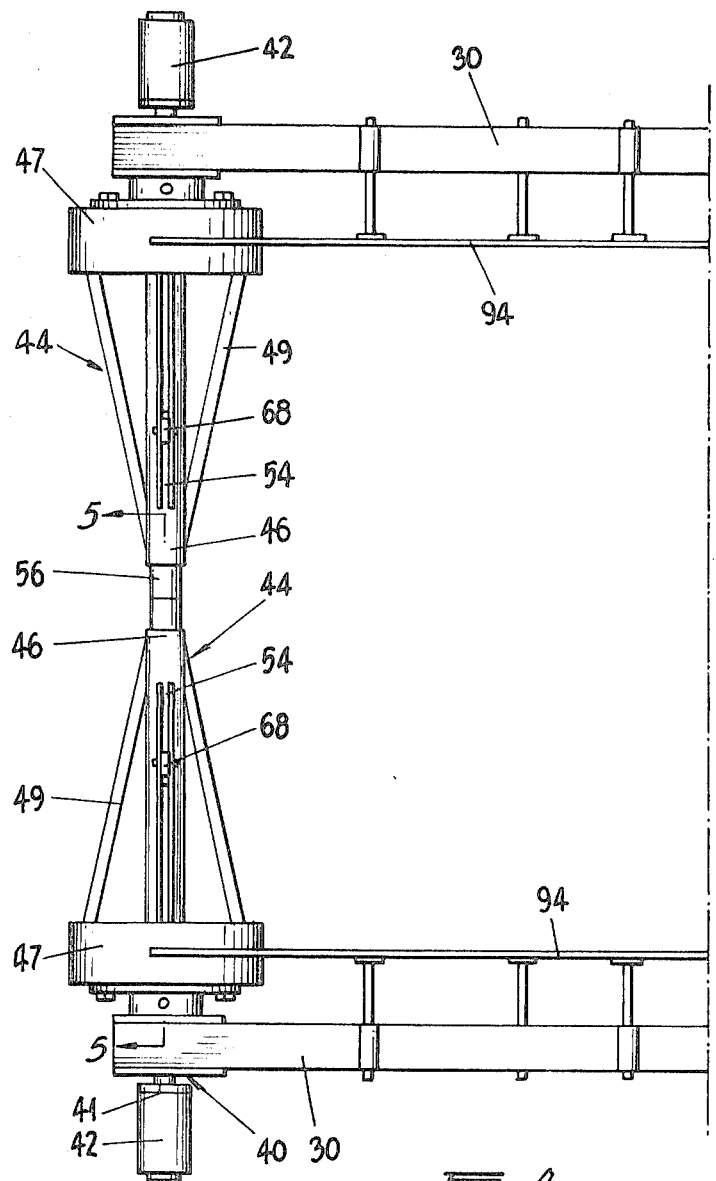

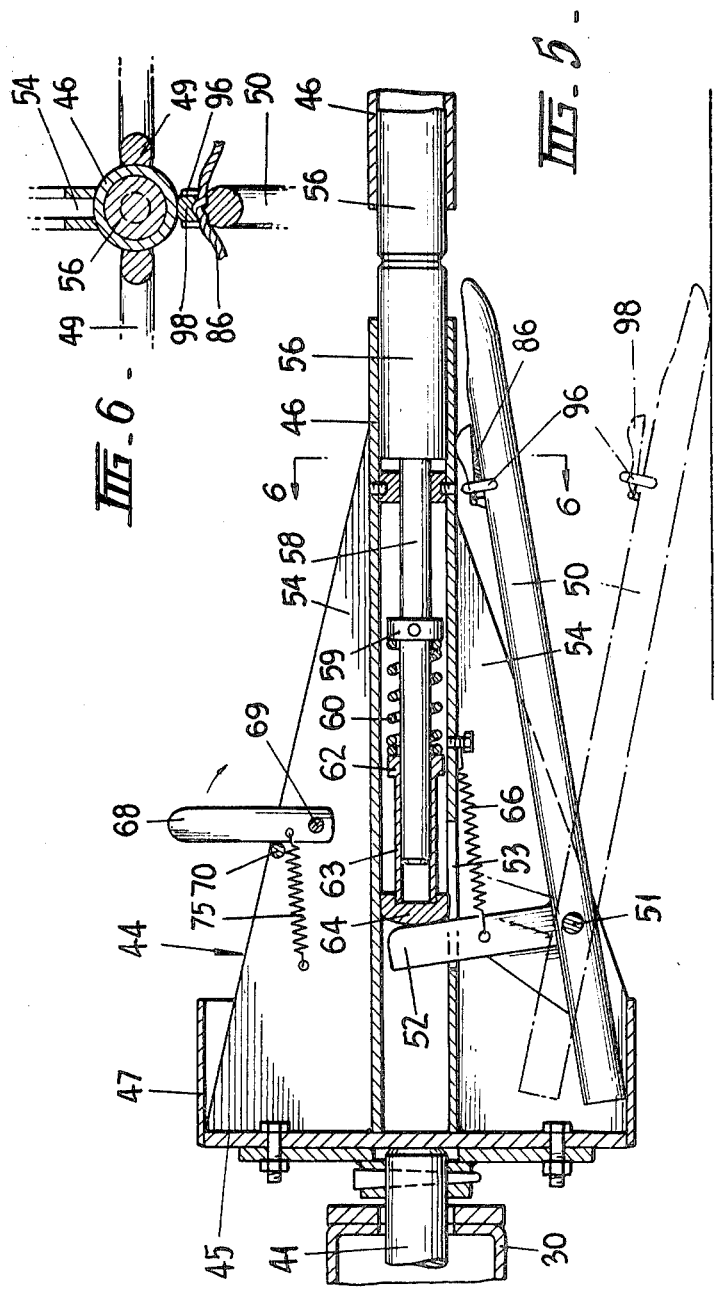

3,611,693
ROLL FORMING FODDER HARVESTERS
William Richard Clifford Geary, Flat 4, 18 Kensington Road, South Yarra, Victoria, Australia
Filed Dec. 29, 1969, Ser. No. 888,354
Int. Cl. A01d 39/00
U.S. Cl. 56—343
14 Claims

ABSTRACT OF THE DISCLOSURE

The invention relates to improvements in a roll forming fodder harvester of the kind adapted to lay a plurality of flexible members longitudinally beneath a windrow of mown fodder and then to wind the fodder together with the flexible members about at least one transversely arranged rotatable core member to form a roll. The core member is supported so that it may be raised and lowered and also moved approximately axially, i.e. laterally towards and from the windrow.

The invention provides a rotary core member incorporating means for clamping the said flexible members and some of the fodder thereto as they lie on the ground. For this purpose, the core member preferably comprises an axially disposed member which is rigidly supported at its outer end, and a longitudinally extending clamping arm arranged radially outwardly of the axial member and pivotally supported at its outer end whereby the free inner end of this arm may be moved inwardly towards and outwardly from the free inner end of the axially disposed member.

The core member is preferably unbalanced and is rotatable by driving means which may be disconnected so as to allow the core member to turn freely until the pivoted clamping arm is at the bottom.

Thus, when the core member is lowered to its full extent and then moved laterally inwards towards the windrow, the free inner end of the pivoted clamping arm passes beneath the windrow and the flexible members while the axial member of the core passes inwardly above said flexible members and some, at least, of the windrow material.

As the core member closely approaches its innermost position, actuating means cause the clamping arm to move upwards towards the axial member and thus clamp the intervening flexible members and fodder material.

The clamping arm is preferably provided at an intermediate position in its length with an inward projection which forms a stop for the flexible members as they slide outwardly over the arm and a clamping finger is preferably pivoted to the arm adjacent to the said stop to clamp the flexible members securely.

This invention relates to improvements in fodder harvesters of a kind previously proposed by me and which is adapted when moved along a windrow of mown fodder to wind the latter about transversely arranged rotating core means whereby the material is formed into a roll which remains in contact with the ground.

My said prior machine was also adapted to lay one or more suitable flexible members, e.g. jute yarn, longitudinally below the windrow and to wind it with the latter about the said rotating core means, in order both to assist the roll forming operation and to impart sufficient strength to the resultant roll to facilitate its storage and transport without excessive disintegration. For this purpose, the machine included means for progressively raising the windrow in advance of the rotating core means, to enable the yarns to be paid out below it, after which the raised material was re-deposited on the ground in advance of the said core means.

One form of my said prior machine comprised a laterally opposed pair of longitudinally extending side arms which were pivotally mounted at their forward ends in such a manner that they could be raised and lowered in unison and also swung inwardly towards and outwardly from each other, and the free rear ends of these side arms supported the rotatable core means.

The present invention provides improvements in roll forming fodder harvesters of the aforesaid kind and relates more particularly to improved rotatable core means which facilitate the attachment thereto of the windrow.

According to the present invention, a roll forming fodder havester comprises at least one transversely extending rotatable core member including means operable to clamp thereto one or more flexible members lying on the ground and extending longitudinally beneath a windrow.

The rotatable core member is preferably movable inwardly towards the windrow from one side thereof, and vice versa, and said clamping means preferably includes a longitudinally extending clamping member having a free inner end which passes inwardly beneath the windrow and said flexible members, as they lie on the ground, and a co-acting clamping member which passes above said flexible members and which may form the hub of the core member.

That said clamping members which passes beneath the windrow and said flexible members may be a clamping arm which is pivotally supported at or near the outer end of the core member whereby after the free inner end of this arm passes beneath the flexible members and the windrow, it may be swung upwardly towards said co-acting clamping member thereby to clamp the interposed material.

The core member is preferably of inwardly convergent form to facilitate its withdrawal from a formed pasture roll and for this purpose, it may comprise a central hub member which supports one or more longitudinally extending inclined members which are spaced angularly about the hub member and each of which has its inner end secured to said hub member adjacent its free inner end. These members incline outwardly from their inner ends to supporting means adjacent the outer end of the core member. The aforesaid pivoted clamping arm is pivotally supported at such a distance from the axis of the core member, that when this arm is in its closed position, it inclines forwardly and inwardly so that its free inner end is disposed in contact with or close to the free inner end of the hub member.

The clamping arm may be constantly urged towards its open position by a spring and means are preferably provided for automatically moving the arm to its closed clamping position as the core member closely approaches its innermost position and for this purpose movable actuating means may be arranged at the free inner end of the member for engagement at or near its innermost position with a suitable abutment.

For this purpose, the core member may have a tubular hub provided with a push rod or the like which projects from its inner end and which when moved outwardly in the hub, engages and displaces a radial inward extension on the said clamping arm.

The said pivoted clamping arm or other clamping member which passes beneath the windrow and the flexible members may be provided at a suitable intermediate position with an upward projection which forms a locating stop for the flexible members as they slide outwardly thereover and a pivoted clamping finger or the like may be mounted on said clamping arm or other equivalent clamping member to clamp the thus located flexible members.

The core member is preferably provided with one or more spring-loaded driving dogs or the like which normally project outwardly therefrom for driving engagement with the fodder wound thereon and which may swing inwardly to collapsed positions to facilitate the withdrawal of the core member from a roll.

The core member may be unbalanced whereby when it is permitted to turn freely about its axis, it assumes the position in which the said clamping arm is disposed at the bottom thereof. Means are provided for permitting the core member, when disposed at or near its innermost position, to be driven in the direction required to wind a roll thereon and for permitting said core member to turn freely about its axis when it is at or near its outermost position.

Preferably, the machine comprises two similar rotatable core members which are disposed co-axially with their inner ends close together during the roll forming operation and each core member is preferably supported at its outer end on the free rear end of a corresponding side arm which has its forward end pivotally supported so that the two side arms may be raised and lowered in unison and also moved inwardly towards or outwardly from each other.

In the accompanying drawings:

FIG. 1 is a view in side elevation of one preferred form of roll forming fodder harvester in accordance with the invention, FIG. 2 is a view of the machine in transverse vertical section taken on the line 2—2 of FIG. 1, FIG. 3 is a view in plan of the forward part of the machine, FIG. 4 is a view in plan of the rear part of the machine;

FIG. 5 is a view in vertical transverse section taken on the line 5—5 of FIG. 4, and FIG. 6 is a view in sectional end elevation taken on the line 6—6 of FIG. 5.

The fodder harvester shown in the drawings is adapted to be attached to the lifting arms and control link of a linkage tractor though the invention is equally applicable to a self-supporting machine adapted to be towed behind a tractor, or to a self-propelled machine, or to a machine adapted to be rigidly attached to and carried on a tractor.

The illustrated harvester has a transverse main frame structure at its forward end comprising spaced vertical posts 10 which are rigidly connected by upper and lower transverse beams 12 and 14 respectively.

The lower end of each post 10 is fitted with a transport wheel 16 and the transverse beams 12 and 14 are provided with forwardly projecting lugs 18 and 20 to which the rear ends of the tractor control link 22 and lifting arms 24 are detachably pivotally connected.

When the harvester is in use, the tractor arms are lowered so that the transport wheels 16 rest on the ground but the entire machine may be lifted clear of the ground for transport.

A transverse rock member 26 arranged behind and close to the said frame structure is pivotally connected to the beam 14 so as to be capable of rocking about an axis disposed parallel thereto and transversely with respect to the machine, and for this purpose, it is connected to the beam by spaced co-axially aligned pivot pins 28.

Each end of the transverse rock member 26 is pivotally connected to the forward end portion of a corresponding longitudinally extending side arm 30 by a pivot pin 32 arranged at right angles to the transversely extending pivotal axis of the rock member. These pivot pins 32 are thus arranged more or less vertically but are tilted when the member 26 is rocked sidewise so that when the arms 30 are lowered as shown in FIG. 1, the pivot pins incline upwardly and rearwardly at a corresponding angle to the vertical plane.

Thus, the said side arms 30 may be swung inwardly and outwardly towards and from each other about their respective pivot pins 32 and may also be raised and lowered in unison by turning, together with the rock member 26, about the transversely extending pivotal axis of the latter.

One of the side arms 30 is formed with a forward extension 30a which is connected by an obliquely disposed pivoted link 34 to the other side arm at a corresponding position behind its respective pivot pin 32 whereby these arms are constrained to move inwardly and outwardly in unison. The said side arms are also connected together a short distance behind the rock member 26 by an adjustable transversely disposed pivoted link, comprising a hydraulic cylinder 36 and plunger rod 38, and by operation of which the arms are moved towards and from each other.

The side arms are connected to the posts 10 by chains 37 to enable the entire machine to be raised by the tractor lift arms but when these are lowered, the rear ends of the side arms are supported either by ground skids 39 attached thereto or by a roll 35 of fodder being formed by the machine.

The free rear end of each side arm 30 is provided with bearings 40 for a rotatable transverse spindle 41 which may be directly coupled at its outer end to an individual hydraulic driving motor 42, and a co-axial windrow winding or core member generally designated 44, is detachably secured at its outer end to the inner end of the spindle. When the side arms 30 are disposed in their inner positions, these two rotatable core members are disposed co-axially.

Each rotatable core member comprises an elongated hub tube 46 which has its outer end secured centrally to the inner face of a flanged end disc 47 which in turn is detachably secured to a coupling flange 48 on the inner end of the respective spindle 41.

A plurality of longitudinally extending and angularly spaced members 49 and 54 which converge inwardly from the end disc 47 to the free inner end portion of the hub tube 46 reinforce the core member and impart a skeleton conical shape to it.

The two members 49 are arranged in diametrical opposition and each consists of a bar which has its outer end welded to the peripheral portion of the end disc while its inner end is welded to the hub tube adjacent to its free inner end. The two members 54 are also diametrically opposed and located midway between the bars 49 and each comprises a closely spaced pair of plates of triangular shape which are welded to the hub tube and also to the end disc.

A longitudinally extending clamping arm 50 is arranged between the spaced plates of one of the members 54 and is pivotally connected to them by a transverse pin 51. The free inner end portion of the clamping arm projects beyond the plates 54 and when in its closed position, its free end substantially abuts against the hub tube as shown in full lines in FIG. 5.

The clamping arm is also provided adjacent to its pivot pin with an inward radial extension 52 which projects into the interior of the hub tube through a longitudinally extending slot 53 therein.

A push rod 56 slidably mounted within each hub tube 46 and projecting from its inner end has a co-axial outward extension 58 of smaller diameter fitted with a collar 59 which forms an abutment for the inner end of a compression spring 60.

The outer end of this spring abuts against a collar 62 on the inner end of a tube 63 which is slidably mounted on the spindle 58 and the outer end of this tube projects some distance beyond the free outer end of the spindle and is fitted with a striker head 64 for engagement with the free inner end of the aforesaid radial extension 52 on the respective clamping bar.

Except when the side arms are disposed in their innermost positions, the core members may turn freely, as in such circumstances the inlet and outlet ports of their respective hydraulic driving motors are connected by a by-pass in a selector valve (not shown) which may be mounted on the beam 14 for operation by a projection on the plunger rod 38 of the adjustable link by which the side arms are moved inwardly and outwardly. Also, the skids 39 hold the core members clear of the ground when the side arms are in their lowermost positions and each core member is eccentrically loaded in such a way that when it can turn freely, it assumes the position in which the respective clamping arm is at the bottom as shown in FIG. 5.

Under such circumstances, each clamping arm tends to drop into its open position with its free end resting on the ground but this opening movement is assisted and ensured by a tension or other spring 66.

When the side arms are moved inwardly in unison and closely approach their innermost or normal operating positions, the projecting inner ends of the co-axially aligned push rods 56 abut together whereby they are caused to slide outwardly within the respective hub tubes 46. During this movement, the spring loaded striker head 64 at the inner end of each push rod actuates the radial extension 52 on the respective clamping arm 50 so that the latter is raised to its normal operating position in which its free end is in contact with or disposed close to the respective hub tube 46 as shown in full lines in FIG. 5.

A transversely disposed sub-frame 72 is arranged between the lower portions of the posts 10 of the main frame structure and its upper end is pivotally connected by transversely extending pivot pins 73 to brackets secured to the underside of the lower transverse beam 14 of the main frame whereby if it encounters an obstruction, the lower end of said sub-frame may swing rearwardly from its vertical position in which it is normally maintained by tension springs 74 and suitable stop means.

The lower end of the sub-frame rotatively supports a transversely extending windrow pick-up roller 76 provided on its periphery with generally longitudinally extending ribs which may be arranged at a small angle to the roller axis.

When the machine is in use, this roller is continuously rotated in the direction of the arrow shown in FIG. 1 so that it progressively raises the windrow which is again deposited on the ground behind the roller after it passes above it.

The roller is connected by an endlss belt drive 78 to one of a shaft 79 arranged above and parallel to the transverse beam 14 of the main frame and mounted in bearings thereon and the opposite end of the shaft is connected to a gear box 80 mounted on this beam at the centre of the machine so that it may be driven by a coupling shaft 82 from the power take-off shaft of the tractor.

The gear box also has a further output shaft which is connected to a hydraulic pump 84 mounted on the beam 14 to supply hydraulic fluid under pressure to the aforesaid hydraulic cylinder 36 and hydraulic motors 42 under the control of suitable valves, some or all of which may also be mounted on the beam 14 or on the rock member 26.

While the windrow is passing above the pick-up roller 76, a plurality of lengths 86 of jute yarn or the like are laid on the ground below it and for this purpose, the required number of spools 87 may be conveniently mounted side-by-side in a box mounted on and near the top of the main frame.

The illustrated machine is adapted to lay four lengths of yarn longitudinally below the windrow in spaced apart relationship and as shown, the spools are of the centre-pull type and two spools are shown for each length for which purpose, the following end of the yarn in the first spool of each pair is tied to the leading end of the yarn in the second spool.

The leading end of each yarn is threaded through suitable eyelets by which it is led to the adjacent side of the machine where it passes around a suitable frictional tensioning device 88 from which it extends downwardly adjacent to the respective post 10 to a further eyelet 89 or the like and then extends inwardly to one of four spaced eyelet members 90 carried by the sub-frame and arranged closely behind the lower part of the pick-up roller 76 so that the yarn passes therethrough onto the ground below the windrow.

At the commencement of the operation, it is necessary to pull these lengths of yarn rearwardly in order that they may be manually attached to the rotatable core members 44 but as hereinafter explained, it is not necessary to repeat this operation with successive rolls.

As the windrow passes over and behind the pickup roller, its side edge portions are deflected inwardly to some extent by deflector plates 92 secured to and extending rearwardly from the sub-frame and side plates 94 which are secured to and spaced inwardly from the side arms 30 confine the roll of fodder as it is being formed about the rotating core members.

At the commencement of the roll forming operation, the side arms 30, which then are supported by the skids 39, are swung outwardly so that the distance between the inner ends of the rotary core members 44 exceeds the width of the windrow. The several lengths of yarn 82 are also pulled out so that they trail behind the pick-up roller for a distance such that they extend below the core members.

The tractor is then driven over one end of the windrow so that it straddles the latter and until the leading end of the windrow is between the spaced core members and during this initial movement of the tractor, the pick-up roller 76 is rotated so that it progressively lifts the windrow which is then deposited on the ground behind the roller and above the yarn lengths 86.

The side arms 30 are then moved inwardly towards each other with the free inner end of each open clamping arm 50 sliding on the ground so that it passes below the respective side of the windrow and below the two corresponding lengths of yarn 86 and when these inward movements are completed, the said inner ends of the clamping arms are disposed close together. During this inward movement, the hub tube passes above at least some of the material in the windrow though much of it may be pushed inwardly by the core member.

Due to the then upwardly and rearwardly inclined attitudes of the pivot pins 32 of the respective side arms, the axis of each core member initially inclines downwardly and inwardly to some extent but it progressively moves upwardly until it is horizontal and this produces a scooping action which facilitates the picking up of the yarns by the free ends of the clamping arms.

As the side arms closely approach their innermost positions and both of the corresponding yarns 86 are lying across the respective clamping arm, the projecting inner ends of the push rods 56 abut together so that during the continuing inward movement of these arms, the push rods move relatively outwards in their respective hub tubes 46 and so cause the clamping arms, together with the material resting thereon, to be raised until the free ends of the arms substantially abut against the respective hub tubes. The yarns 86 and at least some of the windrow material is thus gripped and held by the respective core members whereby when the latter are rotated during the subsequent forward movement of the tractor, the windrow is progressively wound onto the core members to form a roll. If the material should be so tightly packed above the free end portions of the clamping arms that the latter are unable to close completely, or if some of the material is packed between the push rods, the spring loaded striker head 64 prevents damage to the mechanism.

When the side arms complete their inward movements, the aforesaid selector valve for the hydraulic driving motors 42 is actuated so that the latter are automatically driven in the direction necessary to wind up the windrow when a control valve (not shown) is operated by the driver of the tractor.

At this stage therefore, the supporting yarns 86 and some of the windrow material are clamped to the two rotary core members. Consequently, when the tractor is then driven forwardly along the windrow and the two core members are driven in unison in the clockwise direction as shown in FIG. 1, the mown material is picked up and wound around them to form a roll which progressively increases in diameter until it reaches a required diameter which may, for example, be about 4 to 7 feet and during this time the side arms are progressively raised by the roll. In this connection, it should be mentioned that the core members also serve to compress the windrow particularly during the commencement of the formation of each roll as the weight previously supported by the skids is transferred to it. Thus, the inner part of the roll is desirably compact.

In order to ensure that an effective driving engagement is effected between each rotary core member and the fodder, each core member is preferably fitted with at least one driving dog 68 which extends between and is pivotally connected by a pin 69 to that spaced pair of plates 54 which are diametrically opposite to the clamping arm. This dog is normally maintained in contact with a stop 70 by a tension or other spring 75 whereby it projects more or less radially outwards beyond the plates 54 as shown in FIG. 5. When, however, the core members are subsequently being withdrawn from the ends of a formed roll, the pivoted dogs 68 swing inwardly and downwardly towards the free ends of the respective core members 44 to facilitate the withdrawal of the latter.

When the formation of a roll is completed, the tractor is stopped and the side arms 30 are swung outwardly to withdraw the core members 44 from the opposite ends of the roll. Although the core members move outwardly in arcuate paths, their inwardly convergent form enables them to be extracted with comparative freedom.

After the core members are thus removed from the roll, they drop to the ground though their descent is preferably retarded by dashpots. The tractor is then driven forwardly through a short distance and during this movement, the yarn lengths 86 are paid out as they are still connected to the deposited roll which serves as an anchor.

The side arms are then again moved inwardly so that the windrow and the yarns are again clamped to the rotary core members as previously described. Consequently, when the tractor is again driven forwardly to commence the formation of a further roll, the yarns are automatically broken between the core members and the previously deposited roll.

While in favourable conditions, the two yarns 86 which lie on top of each arm 50 and below the windrow material are securely held by the compression imparted to this overlying material, it is preferred to provide means to ensure that the yarns are more positively secured to the core members, because it is important that these yarns should be gripped as they serve to pick up the overlying windrow.

For this purpose and as shown in FIG. 5, each clamping arm 50 is preferably provided at a short distance from its free inner end with a short upward projection 96 which arrests the outward sliding movements of the yarns as the arm is moving inwardly below the windrow. The two yarns may be effectively gripped while they are thus located close together on the upper surface of the arm and this may be achieved for example by providing a corresponding projection on the respective hub tube 46.

Preferably, however, and as shown in FIG. 5, a yarn clamping finger 98 is pivotally mounted on each arm so that it extends inwardly above the latter and beyond the projection 96 so that as each yarn length slides inwardly towards this projection, it passes below the clamping finger, the free end of which abuts against the hub tube and is pressed downwardly onto the yarns, when the clamping arm 50 is raised to its normal operating position.

As the yarns are positively pulled out from the spools 87 by each previously completed and discharged roll 35 until they are again engaged by and clamped to the rotary core members, it is unnecessary to provide means for severing the yarns in advance of each roll when its formation is completed and it is about to be discharged from the machine.

Although each rotatable core member described above and illustrated in the drawings is provided with only one pivoted clamping arm 50, the invention is not limited thereto as, if desired, two or more such clamping arms may be provided and arranged to be closed in unison by the push rod 56.

For example, if three such clamping arms were arranged at equal angular spacings, it would then be unnecessary for the core member to be unbalanced to cause it to assume a predetermined angular position preparatory to the yarn engaging and clamping operation. Thus, a core member provided with three such pivoted clamping arms would automatically assume a position in which two of the three arms would rest on the ground and pass in unison below the yarns and the windrow as the core member is moved inwardly in the manner previously described.

What is claimed is:

1. A roll forming fodder harvester of the kind having at least one transversely extending rotatable core member about which a windrow of mown fodder is progressively wound as the machine moves along the windrow, means rotatively supporting the core member at its outer end, such supporting means being movable upwardly and downwardly and also inwardly and outwardly towards and from the windrow, and means for laying a plurality of laterally spaced flexible members longitudinally below the windrow in advance of the core member, and wherein said core member comprises clamping means operable to attach at least one of said flexible members thereto as it lies on the ground.

2. A roll forming fodder harvester according to claim 1, wherein said clamping means comprises at least one longitudinally extending clamping member having a free inner end which passes beneath the windrow and beneath at least one of said flexible members when said core member, while disposed at or near its lowermost position, is moved inwardly from one side of the windrow, a co-acting clamping member on the core member, and actuating means operable to cause said flexible member and other interposed material to be clamped between said clamping members.

3. A roll forming fodder harvester according to claim 2, wherein said longitudinally extending clamping member is an arm spaced radially outwards from the axis of the core member, and said co-acting clamping member is an elongated axially disposed member rigidly supported at its outer end, and means pivotally supporting said clamping arm at its outer end whereby its free inner end is movable inwardly towards and outwardly from the adjacent free end portion of said co-acting axially disposed clamping member.

4. A roll forming fodder harvester according to claim 3, including resilient means urging said pivoted clamping arm radially outwardly from said co-acting clamping member, and means operable as the core member closely approaches its innermost position to operate said actuating means whereby said pivoted clamping arm is swung radially inwards towards said co-acting clamping member.

5. A roll forming fodder harvester according to claim 4, wherein said core member is unbalanced whereby when it is permitted to turn freely about its axis, it tends to assume the position in which said pivoted clamping arm is disposed in its lowermost position.

6. A roll forming fodder harvester according to claim 5, including driving means operable to rotate said core member in the direction in which the fodder is wound thereon, control means operable in one position thereof to enable the core member to be driven by said driving means and which in another position thereof, enables the core member to turn freely about its axis, and means for actuating said control means at or near a predetermined position as said core member is moving axially inwards and outwards.

7. A roll forming fodder harvester according to claim 3, wherein said actuating means comprises an abutment member movably mounted on said core member and projecting from the inner end thereof, and co-acting abutment means engageable by said abutment member as the core member closely approaches its innermost position, whereby said pivoted clamping arm is caused to swing radially inwards towards said co-acting axially disposed clamping member.

8. A roll forming fodder harvester according to claim 7, including a second rotatable core member which is substantially identical to the first mentioned core member, said core members being co-axially aligned with their free inner ends disposed close together when said core members are disposed in their innermost positions, and wherein said co-acting abutment means is the abutment member movably mounted on and projecting from the inner end of said second rotatable core member.

9. A roll forming fodder harvester according to claim 3, wherein said core member is generally of inwardly convergent form, and including at least one driving dog mounted on the core member and normally projecting outwardly therefrom for driving engagement with the fodder wound thereon, and wherein said driving dog is spring-loaded and pivotally connected to the core member whereby it swings inwardly to a retracted position when the core member is being withdrawn from a roll formed thereon.

10. A roll forming fodder harvester according to claim 3, wherein said pivoted clamping arm is provided at an intermediate position in its length with an inward projection which forms a locating stop for said flexible member or members as they slide outwardly thereover.

11. A roll forming fodder harvester according to claim 10, including a clamping finger pivotally mounted on the pivoted clamping arm adjacent to said inward projection thereon whereby said flexible member or members pass below the clamping finger as they closely approach said projection.

12. A roll forming fodder harvester according to claim 3, wherein said axially disposed clamping member is a tubular hub member and wherein said actuating means for the pivoted clamping arm comprises a push rod slidably mounted in said hub member and projecting from the inner end thereof, and a radially inward extension on the pivoted outer end of said clamping arm, said inward extension being engageable by the push rod, whereby as said core member closely approaches its innermost position, the projecting inner end of the push rod abuts against a co-acting abutment and is moved relatively outwards in the hub member as said core member completes its inward movement, thereby to force said clamping arm radially inwardly towards the hub member.

13. A roll forming fodder harvester comprising a laterally opposed pair of longitudinally extending side arms, each side arm being pivotally supported at or near its forward end whereby said arms may be moved upwardly and downwardly in unison and also inwardly towards and outwardly from each other, a transversely extending rotatable core member rotatively supported on the free rear end of each side arm and projecting inwardly therefrom, said core members being arranged co-axially with with their inner ends in contact or close together when said side arms are disposed in their innermost positions, driving means individual to each core member, whereby a windrow of mown fodder may be progressively wound about said core members as the machine moves along the windrow, and means disposed in advance of said core members for progressively laying a plurality of laterally spaced flexible members longitudinally beneath the windrow, and wherein each core member is of inwardly convergent form and comprises an elongated hub member and a longitudinally extending clamping arm disposed radially outwardly of the hub member, said clamping arm being pivotally supported adjacent the outer end of the core member, whereby it is angularly movable towards said hub member from an open position to a clamping position thereof, and vice versa, and wherein each core member is unbalanced and is permitted to turn freely about its axis when it is disposed at or near its outermost position whereby it assumes the angular position in which the said clamping arm thereon is disposed at the bottom thereof, whereby said clamping arm is adapted when in its said open position to pass beneath the windrow and below at least one of said flexible members as the core member, when disposed at or near its lowermost position, is moved inwardly from the respective side of the windrow, and actuating means operable, when said core members are completing their inward movements, to move each clamping arm upwardly to its clamping position thereby to clamp said flexible member or members and other interposed material between it and the respective hub member.

14. A roll forming fodder harvester according to claim 13, wherein said hub member of each core member is tubular in form, and wherein said actuating means for each clamping arm comprises a push rod or the like slidably mounted in the respective tubular hub member and projecting from the inner end thereof, and a radially inward extension on the pivoted outer end of each clamping arm, said inward extension being engageable by the respective push rod or the like, whereby as said core members approach their innermost positions, the projecting inner ends of the respective push rods or the like abut together and move relatively outwards in their respective hub members as said core members complete their inward movements, thereby to force said clamping arms upwardly and inwardly towards the respective hub members.

References Cited

UNITED STATES PATENTS

| | | | |
|---|---|---|---|
| 2,597,962 | 5/1952 | Whitley | 56—1 |
| 2,693,285 | 11/1954 | Buschbom | 214—147 G X |
| 3,006,489 | 10/1961 | Ealet | 214—147 G |
| 3,421,643 | 1/1969 | Barbee | 214—147 G |
| 3,529,735 | 9/1970 | Wehde | 214—147 G |

RUSSELL R. KINSEY, Primary Examiner

U.S. Cl. X.R.

214—147 G